May 21, 1935.　　　　L. H. L'HOLLIER　　　　2,002,375
METHOD OF MAKING ORNAMENTED RUBBER ARTICLES
Filed April 24, 1934
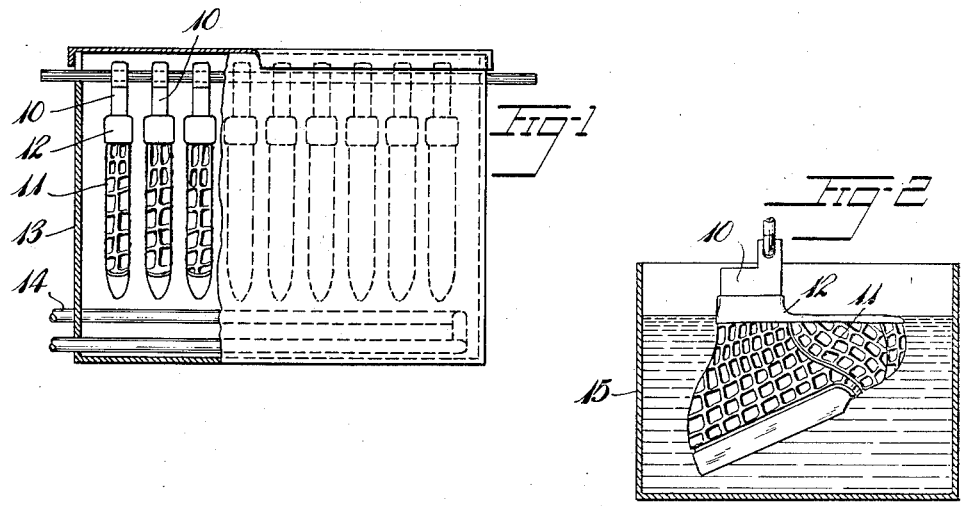
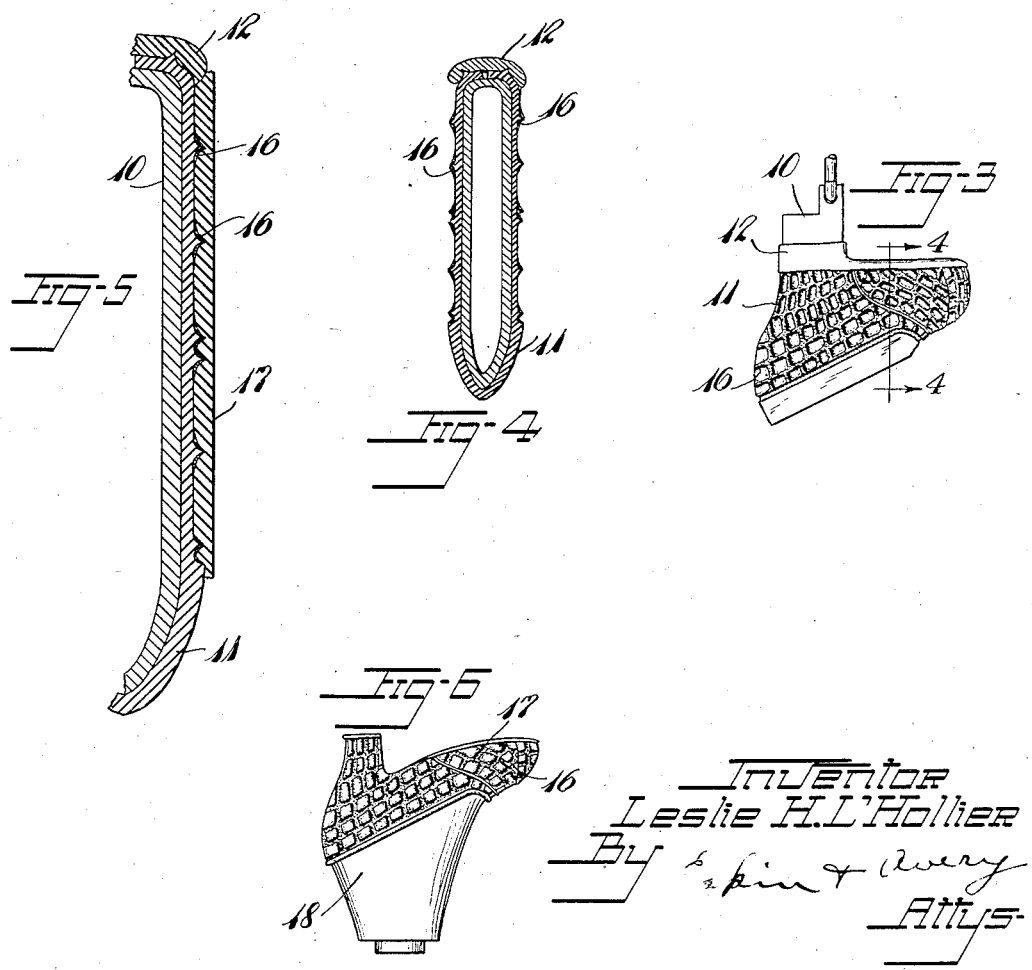
Inventor
Leslie H. L'Hollier
By Sikin & Avery
Attys Patented May 21, 1935

2,002,375

UNITED STATES PATENT OFFICE 2,002,375

METHOD OF MAKING ORNAMENTED RUBBER ARTICLES

Leslie H. L'Hollier, Waltham, Mass., assignor to Hood Rubber Company, Inc., Watertown, Mass., a corporation of Delaware Application April 24, 1934, Serial No. 722,122

4 Claims. (Cl. 18—58)

This invention relates to the manufacture of ornamented rubber articles and especially to the production of rubber articles with both variegated and configured surfaces. This invention is an improvement upon the subject matter of the copending application of A. L. Diller and myself, Serial No. 713,167, filed February 27, 1934, for Method of making ornamented rubber articles, and assigned to the same assignee as is the present application.

In the procedure of that application a negative form is provided having a configured surface comprising miniature valleys and hillsides, and upon this form is deposited an ornamenting dispersion, preferably an aqueous dispersion of rubber including the desired coloring agent, which dispersion is permitted to settle on the irregular surface of the form under the influence of surface tension of the liquid and gravity to provide ornamental effects. After such deposits have dried a backing layer of rubber is molded upon the ornamenting rubber against the form and is removed with the ornamenting deposits adhered to its molded surface and with the surface color of the backing rubber appearing between the deposits.

The chief objects of the present invention are to provide improved procedure whereby further variations in the ornamental effects may be obtained, and to provide for convenience in the procedure.

A further object is to obtain distinctive ornamentation by encouraging the effect of surface tension on a liquid dispersion of ornamenting material deposited upon the surface of a configured matrix form while deterring the effect of gravity on the deposited dispersion.

A more specific object is to provide for producing ornamenting deposits in such disposition on the surface of the final configured article that the deposits appear predominantly on all of the miniature hillsides of the surface with the surface of the backing rubber appearing between the deposits, as distinguished from a disposition of the deposits predominantly on only certain of the hillsides, or predominantly on the tops of the projecting surfaces, as disclosed in the last-mentioned application.

These and further objects will appear from the following description, reference being had to the accompanying drawing, in which:

Fig. 1 is an elevation, with parts broken away and sectioned, of a chamber for heating the matrix forms in accordance with the preferred procedure of the invention.

Fig. 2 is a cross-section of a dipping tank with a matrix form immersed in a dispersion therein in accordance with the invention.

Fig. 3 is an elevation of the matrix form of Fig. 2 having ornamenting material deposited upon it.

Fig. 4 is an enlarged section taken along the line 4—4 of Fig. 3.

Fig. 5 is a still greater enlargement, with parts broken away, of the form and ornamenting material of Fig. 4 having a layer of backing rubber deposited upon the same.

Fig. 6 is an elevation of a lasted, ornamented shoe constructed according to the invention.

For the purpose of deterring the effect of gravity on the liquid dispersed ornamenting material that is deposited upon the matrix form and for assisting it to dry in the disposition effected principally by surface tension, the drying is accelerated, which may be carried out by drying in the presence of heat above ordinary room temperature, preferably by heat from the body of the matrix form itself.

In order to fulfill the object of providing deposits predominantly on all the hillsides of the final article, the configured matrix form, upon which the article is formed, is coated with a dispersion of the ornamenting material which is of such liquidity that by virtue of the meniscus formed under the influence of surface tension the dispersion will be disposed predominantly upon the hillsides of the form surface, and provision is made for drying the dispersion, as above described, with such rapidity that the dispersion retains such disposition and does not flow under the effect of gravity to gather perdominantly on the lowermost hillsides as determined by the position of the form during the drying.

After the drying operation a backing layer of rubber is molded against the matrix form and deposits and is removed with the positive impression in its surface and the ornamenting deposits disposed predominantly upon the miniature hillsides of its surface.

The article, as in the case of the shoe chosen for illustration, is then assembled with its other parts upon a shaping support and vulcanized.

Referring to the drawing, the footwear form may comprise an internal support 10 of generally flat sides, upon which is mounted a layer of matrix material, preferably rubber, presenting an outer negative matrix surface 11 having miniature hills and valleys constituting a negative of the configuration, for example, a molded negative of the surface of a reptile skin. The upper end of the matrix sheath may be bound to the support and closed by a tape 12.

For the purpose above described the form may be heated along with others of its kind in a heating chamber 13 (Fig. 1), as by a steam pipe 14. Good results have been obtained by heating the form to approximately 150° F.

The form is then taken from the heater and immersed in a tank 15 of dispersed ornamenting material, preferably an aqueous dispersion of rubber containing a suitable coloring agent, the dispersion preferably being of such liquidity that its solid matter comprises only about eight to fifteen percent by weight of the dispersion. The proportion of solid matter is governed to some extent according to whether a deep or pale shade of the color is desired. In order to avoid objectionable trapping of air at the form surface, the form may be preliminarily wetted, as by dipping it into a bath of water before it is dipped into the ornamenting dispersion.

While the form is yet heated it is removed from the tank 15 and is suspended as shown in Fig. 3 so that the superfluous dispersion will drain from it and the remaining dispersion will, by the action of surface tension, assume a meniscus in which the coloring appears predominantly at all the hillsides of each valley as shown at 16, 16 in Figs. 3, 4 and 5. The heat from the form accelerates the drying of the dispersion so that the meniscus does not sag materially to a disposition predominantly upon the lowermost hillside, but rather retains its more uniform disposition upon all of the hillsides of each valley.

A layer of rubber 17 (Figs. 5 and 6) is then molded upon the form and deposits, preferably by depositing the rubber directly upon the form from an aqueous dispersion of the rubber. This layer is then removed with the deposits 16, 16 adhering to the hillsides of its surface and with its surface color appearing between the deposits. It is then mounted inside out and assembled with other footwear parts upon a shaping support 18 and vulcanized.

The flat form 10 is of such dimensions and proportions that the rubber is not objectionably stretched or wrinkled when it is shaped upon the foot-shaped support 18. The use of the flat form for the rubber-depositing steps of the procedure has the advantage that a number of the forms may be handled together in a minimum space, and, also, the flat form makes for uniformity in the distribution of the ornamenting dispersion over its side surface, the draining being very nearly the same for all of the depressions.

I claim:

1. The method of making an ornamented rubber article which comprises providing a negative form configured with miniature valleys and hillsides in its surface, depositing on said form an ornamenting dispersion of such fluidity that, after draining and at least partially drying, the residue of the deposit appears in areas merging with areas of fainter hue, effecting such draining and drying in the presence of heat, then depositing upon the form a layer of rubber and removing the latter to provide a positive of the surface configuration with the ornamenting deposits adhered to its surface and with its surface color appearing between the areas of deepest hue of the deposits.

2. A method as defined in claim 1 in which the dispersion is of such fluidity and the heat is such as to so accelerate the drying that all of the hillsides of each valley receive the deepest hue of the deposit with substantial uniformity.

3. A method as defined in claim 1 in which the heat is supplied by heating the form before the ornamenting dispersion is deposited upon it and the draining and drying is effected while the form is still hot.

4. The method of making an ornamented rubber article which comprises providing a negative form configured with miniature valleys and hillsides in its surface, depositing on said form an ornamenting dispersion of such fluidity that, after draining and at least partially drying, the residue of the deposit appears principally at the hillsides merging with areas in the valleys of fainter hue, permitting the dispersion so to drain and effecting such acceleration of the drying that the meniscus of the residue in each valley does not materially sag by gravity, then depositing upon the form a layer of rubber and removing the latter to provide a positive of the surface configuration with the ornamenting deposits adhered to its surface and with its surface color appearing between the areas of deepest hue of the deposits.

LESLIE H. L'HOLLIER.